United States Patent Office 3,437,711
Patented Apr. 8, 1969

3,437,711
PROCESS FOR PRODUCING ISOPRENE FROM ISOBUTYLENE AND FORMALDEHYDE IN ONE STAGE
Masaya Yanagita, 162 Kamihoya, Hoyamachi, Kitatamagun, and Takashi Mitsui, 1 1-chome, Nakameguro, Meguro-ku, both of Tokyo, Japan, and Masao Kitahara, 5–3 3-chome, Tendai, Chiba-shi, Chiba-ken, Japan
No Drawing. Continuation-in-part of application Ser. No. 328,467, Dec. 6, 1963, now Patent No. 3,253,051. This application Apr. 27, 1966, Ser. No. 545,570
Claims priority, application Japan, May 13, 1963, 38/23,961, 38/23,962, 38/23,963, 38/23,964, 38/23,965
Int. Cl. C07c *1/24, 11/18*
U.S. Cl. 260—681                                6 Claims

ABSTRACT OF THE DISCLOSURE

This invention relates to a process for obtaining isoprene with high yield from isobutylene and formaldehyde in one stage in vapor phase using a catalyst deposited on a carrier of silica gel, said catalyst being composed of phosphoric acid and the oxides or hydroxides of the elements in Group IIa of the Periodic Table (calcium, magnesium, beryllium, strontium and barium), and heat-treated at a temperature between 650 and 900° C., in the presence of air.

---

This application is a continuation-in-part of patent application Ser. No. 328,467, filed on Dec. 6, 1963, now Patent No. 3,253,051.

This invention relates to a process for the direct production of isoprene from isobutylene and formaldehyde.

Because of the recent growing demand for isoprene as a starting material for the production of synthetic rubber and the like, it is especially desirable to manufacture a high-purity isoprene in an economic way.

To satisfy the general desire, many processes for the production of isoprene by the condensation of isobutylene and formaldehyde have hitherto been proposed. They are roughly classified into two general methods. One is a two-stage method in which the first step is the condensation of isobutylene and formaldehyde to an intermediate product such as 4,4-dimethyl-1,3-dioxane and then, by the second step, said intermediate product is converted to isoprene usually in vapor phase as represented by the Formula 1. The other method is a direct method (one-stage method) of obtaining isoprene by the reaction of isobutylene with formaldehyde in vapor phase as by the Formula 2.

$$CH_3\text{-}C(CH_3)=CH_2 + 2HCHO \longrightarrow$$
isobutylene formaldehyde $$\longrightarrow \text{4,4-dimethyl-1,3-dioxane} \longrightarrow C(CH_3)=CH\text{-}CH=CH_2 + HCHO + H_2O \quad (1)$$
isoprene From this scheme, one step is:

$$(CH_3)_2C=CH_2 + HCHO \longrightarrow (CH_3)C\text{-}CH=CH_2 + H_2O \quad (2)$$
isobutylene formaldehyde        isoprene For the direct method with which the present invention is concerned, numerous types of catalysts have been proposed, including alumina, silica-alumina and cadmium phosphate. However, none has yet been considered as fully satisfactory for the purpose of producing isoprene effectively.

This invention relates to an improved process for obtaining isoprene directly by the condensation of isobutylene and formaldehyde in vapor phase with a catalyst composed of an oxide or hydroxide of an element in Group IIa of the Periodic Table, or a mixture of at least two such compounds, and phosphoric acid.

The oxides and hydroxides of metals used as the catalysts under the invention are obtained by suitable processes, and the types of phosphoric acid which can be used for the purpose include orthophosphoric acid, pyrophosphoric acid, metaphosphoric acid, phosphoric anhydride, their mixture and polyphosphoric acid.

A mixture of compounds in those two groups gives a most suitable catalyst for this invention, and the preparation of the catalysts is extremely important. The catalysts are obtained usually under such conditions that a catalyst carrier of silica gel is dipped in the solution of the element in Group IIa of the Periodic Table (other than radium, for instance, calcium, magnesium, beryllium, strontium or barium), and the resultant product is treated with suitable method, and mixed with the phosphoric acid, and dried and heat-treated at temperatures between 650 and 900° C., preferably 700 and 800° C. A heat treating time may vary in accordance with its temperatures, and especially when a comparatively low temperature is employed the heat-treatment for a longer time is effective.

Thus, it is desirable that the heat treating time is 1 to 30 hrs., preferably 1 to 10 hrs.

The ratios by weight of the catalyst to be deposited on a carrier of silica gel to the carrier and the molar ratio of the elements of Group IIa to phosphoric acid in the catalyst may vary within moderately wide limits.

Generally, the effect of the catalyst on the reaction does not so much depend upon a ratio by weight of the elements of Group IIa in the catalyst to a carrier of silica gel. However, the conversion rate tends to decrease especially when the catalyst contains the elements in less amount, while the selectivity does so when it contains them in excessively large amount.

Thus, it is desirable that the ratio of catalyst to silica gel should be in a range of 0.2 to 30% by weight.

In addition, the effect of the molar ratio of the elements of Group IIa to phosphoric acid in the catalyst is as follows:

The conversion rate tends to increase simultaneously with the selectivity tending to decrease when the molar ratio is lower, and the selectivity is also liable to decrease when the molar ratio is excessively high. And, it is preferred that the molar ratio should be 0.1 to 20%.

The selectivity to isoprene when used the calciumphosphoric acid oxide catalyst on a carrier of silica gel is shown below:

| | Temperatures of heat-treatment (° C.) | | | | | | | |
|---|---|---|---|---|---|---|---|---|
| | 400 | 550 | 600 | 650 | 700 | 800 | 900 | 1,000 |
| Conversion of formaldehyde (percent) | 93.0 | 78.3 | 75.5 | 69.0 | 62.8 | 62.5 | 57.0 | 49.5 |
| Selectivity to isoprene (percent) | 45.6 | 59.0 | 66.0 | 68.3 | 73.2 | 72.7 | 68.0 | 66.5 |

Reaction temperature ° C__ 250
Mol ratio of isobutylene/formaldehyde _____ 7.5
Space velocity of formaldehyde,
  mols/hr./l. catalyst _____ 1.2
Reaction time, hours _____ 21

In the above reaction selectivity is more important than conversion rate. As the above table shows, a remarkable selectivity is obtained when heat-treated at high temperatures between 650 and 900° C. (preferably, 700 and 800° C.), and this means that the heat-treatment at the above temperatures of the specific range, after dipping in a catalyst carrier of silica gel is extremely important.

The comparative test results of a catalyst prepared by pretreating a catalyst carrier of silica gel at the said temperatures and then dipping the catalyst components in the said pre-treated carrier, and the catalyst of the present invention are shown as follows:

EFFECTS OF CATALYST FOR TEMPERATURES OF HEAT-TREATMENT

| | Temperatures of heat-treatment (° C.) | | | | | | | |
|---|---|---|---|---|---|---|---|---|
| | 400 | 550 | 600 | 650 | 700 | 800 | 900 | 1,000 |
| Selectivity to isoprene (percent): | | | | | | | | |
| Catalyst according to the present invention | 45.6 | 59.0 | 66.0 | 68.3 | 73.2 | 72.7 | 68.0 | 66.5 |
| Catalyst prepared by pretreating a carrier | 42.2 | 41.0 | 38.7 | 36.4 | 33.8 | 27.6 | 20.9 | 14.1 |

From these results, silica gel seems to have an excellent catalytic activity in combination with the catalyst after said heat-treatment, or some complex compound seems to have been formed after heat-treatment of silica gel which supports the oxides or hydroxides of the elements of Group IIa and phosphoric acid, and this catalytic compound is considered to show excellent properties as a catalyst.

The materials to be used are isobutylene and formaldehyde, but other substances which can yield them under reaction conditions, such as corresponding alcohols for isobutylene, and formaldehyde polymers and the like for formaldehyde, may also be employed. Under the invention these two materials are reacted with each other in vapor phase at a temperature from 150 to 450° C., preferably from 180 to 350° C. The reaction pressure is usually atmospheric, but the reaction may be effected under pressure or under reduced pressure as well.

In carrying out the reaction, some substances which are inert to the reaction, e.g. water, carbon dioxide or nitrogen or similarly inactive organic compounds, e.g. saturated or unsaturated hydrocarbons, may be added to the reactant system, if desired, in order to carry out the reaction effectively by removing the heat of reaction or otherwise. The molar ratio of isobutylene to formaldehyde may be varied according to the various reaction conditions, but excess of isobutylene is usually preferable. Similarly, the space velocity may be varied, but it is usually preferred to be between about 0.2 to 30 mols of formaldehyde per liter of the catalyst per hour. The catalyst may take the form of a fixed bed, fluidised bed, moving bed method or the like as desired.

The reaction product is either condensed or is absorbed by a suitable solvent, and is separated by fractional distillation or other suitable procedures. Unreacted isobutylene and formaldehyde can be recycled to the reaction system. The isoprene obtained by the process of this invention has a sufficiently high purity as a raw material for synthetic rubber and the like.

Example 1

Into 75 cc. of water, 9 g. of magnesium chloride is dissolved, and 50 g. of silica gel is dipped in the solution. The resultant product is treated with ammonia, washed with water, mixed with 5 g. of 85% phosphoric acid, dried and treated for two hours at 700° C. to obtain a magnesium hydroxide-phosphoric acid catalyst. A mixture of isobutylene and formaldehyde (vaporized from 37% formalin solution) in the molar ratio of 1:3.2 is passed over said catalyst at a space velocity of 7 mols of formaldehyde per hour per liter of the catalyst. Thereafter, the reaction product is cooled, collected and distilled to obtain a high-purity isobutylene. The results are given in the following table:

Reaction temperature _____ ° C__ 275
Conversion of formaldehyde _____percent__ 22
Selectivity to isoprene _____do____ 79
Purity of isoprene (in C₅ fraction) _____do____ 99.1

Example 2

Into 150 cc. of water, 12 g. of calcium chloride is dissolved, and 100 g. of silica gel is dipped in the solution. The resultant product is treated with ammonia vapor, washed with water, mixed with 10 g. of 85% phosphoric acid, and dried and treated for two hours at 700° C. to obtain a calcium hydroxide-phosphoric acid catalyst.

A mixture of isobutylene and formaldehyde (a mixture of vapor and formaldehyde vaporized from 37% formalin solution) in the molar ratio of 1:7.5 is passed over the said catalyst at a space velocity of 1.2 mols of formaldehyde per hour liter of the said catalyst. Thereafter, the reaction product is cooled, collected and distilled to obtain a high-purity isoprene.

The result is tabled below:

Reaction temperature _____ ° C__ 250
Conversion of formaldehyde _____percent__ 62.8
Selectivity to isoprene _____do____ 73.2
Purity of isoprene (in C₅ fraction) _____do____ 99.3

Example 3

The reaction is carried out according to the process in Example 1. By using the catalyst composing of phosphoric acid and beryllium hydroxide, strontium hydroxide or barium hydroxide, respectively, prepared with the process which is illustrated in Example 1.

The results are given in the following table:

| Catalyst | Conversion of formaldehyde | Selectivity to isoprene | Purity of isoprene (in C₅ fraction) |
|---|---|---|---|
| Beryllium-phosphoric acid | 31.7 | 67.5 | 99.4 |
| Strontium-phosphoric acid | 33.2 | 59.4 | 99.5 |
| Barium-phosphoric acid | 40.1 | 52.5 | 99.1 |

Reaction temperature _____ ° C__ 300
Mol ratio of isobutylene/formaldehyde _____ 3.7
Space velocity of formaldehyde, mols/hr./l. catalyst _____ 8

What we claim is:

1. In a one-stage process for the production of isoprene from isobutylene and formaldehyde in the vapor phase in the presence of a catalyst, the improvement comprising using a catalyst composed of phosphoric acid and at least one compound selected from the group consisting of the oxides and hydroxides of the elements in Group IIa of the Periodic Table, and prepared by depositing said compound on a catalyst carrier, mixing said compound deposited on said carrier with phosphoric acid, drying the resulting mixture and then heat-treating the dried mixture at a temperature beween 650 and 900° C. in the presence of air.

2. A process according to claim 1, wherein the Group IIa compound is of a metal selected from the group consisting of calcium, magnesium, beryllium, strontium and barium.

3. A process according to claim 1, wherein the catalyst is supported by a carrier of silica gel.

4. A process according to claim 1, wherein the heat-treatment is carried out at a temperature between 700 and 800° C.

5. A process according to claim 3, wherein the ratio by weight of the element in Group IIa of the Periodic Table to the silica gel is 0.2 to 30%.

6. A process according to claim 1, wherein the molar ratio of the element in Group IIa of the Periodic Table to phosphoric acid in the catalyst is 0.1 to 20%.

References Cited

UNITED STATES PATENTS

| 2,977,396 | 3/1961 | Stanley et al. | 260—681 |
| 3,024,292 | 3/1962 | Habeshaw et al. | 260—681 |
| 3,146,278 | 8/1964 | Habeshaw et al. | 260—681 |
| 3,253,051 | 5/1966 | Yanagita et al. | 260—681 |

DELBERT E. GANTZ, *Primary Examiner.*

G. E. SCHMITKONS, *Assistant Examiner.*